R. Jennings.
Milling Heads of Screw-Augers.
No. 56,058.          Patented Jul. 3, 1866.
Fig: 1
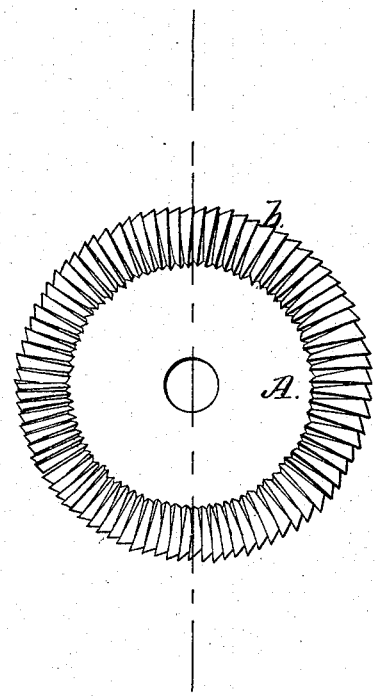
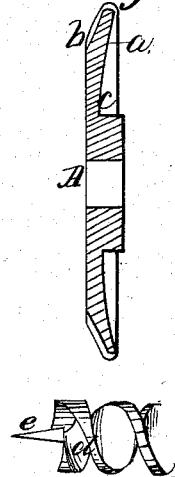
Fig: 2.
Witnesses:
Inventor:
Russell Jennings
per Munn & Co.
Attorneys.
THE GRAPHIC CO. PHOTO-LITH. 39 & 41 PARK PLACE, N.Y.

UNITED STATES PATENT OFFICE.

RUSSELL JENNINGS, OF DEEP RIVER, CONNECTICUT.

IMPROVED TOOL FOR FINISHING AUGERS.

Specification forming part of Letters Patent No. 56,058, dated July 3, 1866.

*To all whom it may concern:*

Be it known that I, RUSSELL JENNINGS, of Deep River, Middlesex county, Connecticut, have invented a new and Improved Tool or Implement for Finishing the Heads or Cutting Portions of Screw-Augers; and I do hereby declare that the following is a full, clear, and exact description thereof, which will enable those skilled in the art to make and use the same, reference being had to the accompanying drawings, forming part of this specification, in which—

Figure 1 is a side view of my invention. Fig. 2, a section of the same, taken in the line $x$ $x$, Fig. 1.

Similar letters of reference indicate corresponding parts.

This invention relates to a new and improved tool or implement for finishing the heads or cutting portions of screw-augers; and it consists of a rotary wheel or burr of a peculiar shape, as hereinafter fully shown and described, whereby the workman is enabled to apply the auger to the wheel or burr and manipulate the former in such a manner that all parts of its cutting portion necessary to be operated upon may be brought in contact with the tool and the work performed in an expeditious and perfect manner.

A represents a wheel, which is fitted upon a suitable shaft or mandrel. One side of this wheel, at its edge, is beveled, as shown at $a$, and is corrugated radially, so as to form a series of cutters, $b$. The extreme edge of the wheel A is rounded, and the cutters $b$ extend around this edge, forming a semicircular cutting-surface, as shown clearly in Fig. 2.

The opposite side of the wheel A is made concave, as shown at $c$, said side gradually receding inward or toward the center of the wheel from the ends of the semicircular portions of the cutters $b$.

By this arrangement a cutting-surface is given the wheel A by which the head of the auger may be finished in a perfect manner and very expeditiously, the cutters $b$ conforming precisely to the shape of the portion of the auger with which they are brought in contact.

The head of a screw-auger is shown in red in Fig. 2, and it will be seen that the cutting portion of the wheel will fit snugly in the part underneath the cutting-edges $d$, and will operate from the base of the spur $e$ to the outer ends of $d$, leaving a clean, smooth, and open throat, and admitting, under a proper manipulation of the operator, of the form of the screw being perfectly preserved.

In practice I design to have the spur $e$ of the auger fitted in an opening in a proper fixture above the wheel A, to serve as a bearing, so that the operator may grasp the shank of the auger and by moving the former in either direction bring all parts of the cutting-edges of the auger in contact with the cutting-surface of the wheel.

The shape of the cutting-surface of the wheel A is admirably adapted for performing the work designed for it, admitting of said surface operating efficiently upon all parts of the auger in the vicinity of its cutting parts, and doing the work very rapidly.

Having thus described my invention, I claim as new and desire to secure by Letters Patent—

A rotary wheel or burr having a beveled surface, $a$, at one side and a semicircular edge or periphery corrugated to form a series of cutters, $b$, which have a radial, or nearly radial, position, and extend from the inner edge of $a$ to the outer edge of the same and entirely around the semicircular periphery of the wheel, in combination with the concave surface $c$ at the opposite side of the wheel, substantially as and for the purpose herein set forth.

RUSSELL JENNINGS.

Witnesses:
M. M. LIVINGSTON,
WM. E. LYONS.